Patented Oct. 9, 1923.

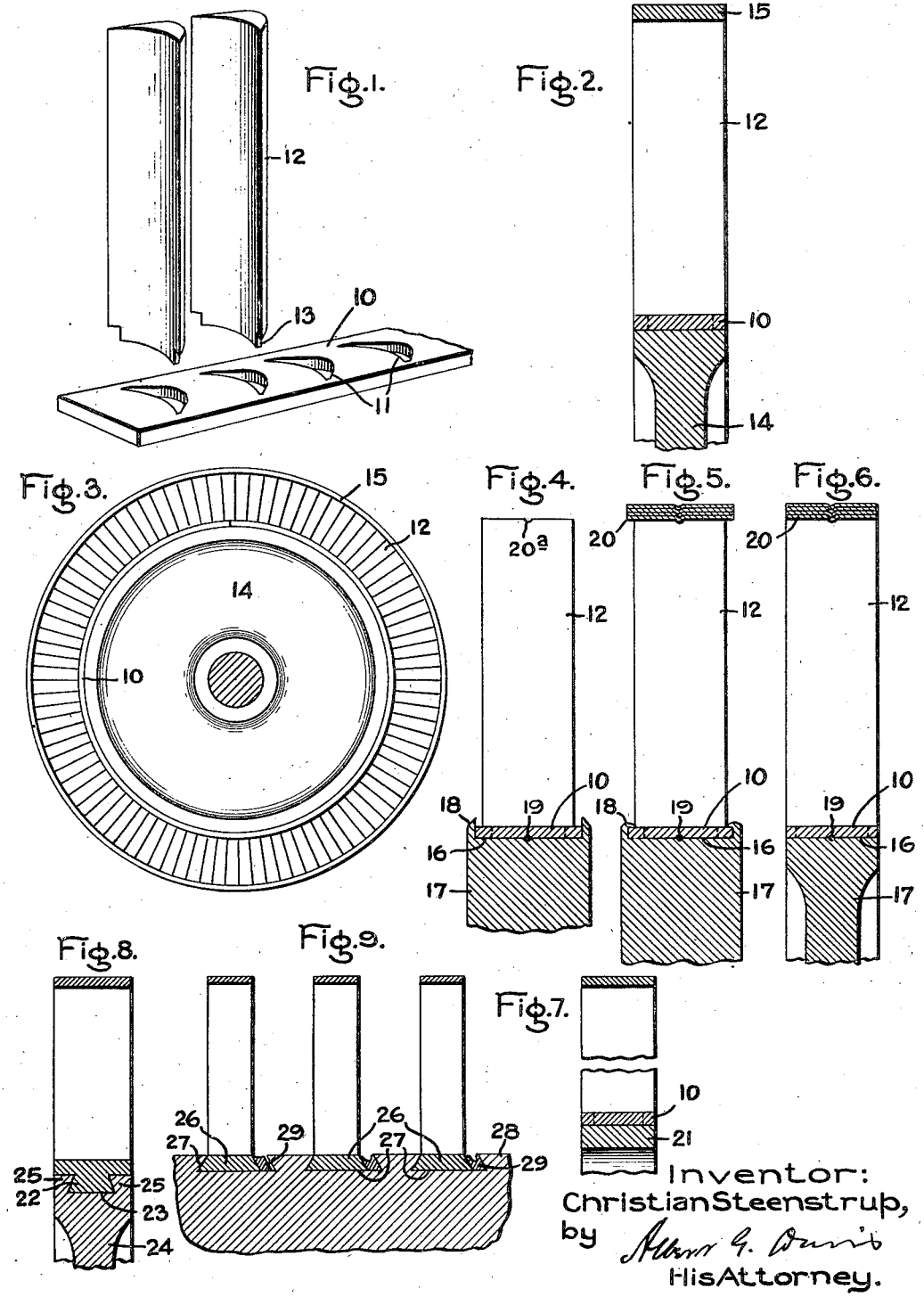

1,470,499

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

ELASTIC-FLUID TURBINE.

Application filed April 27, 1920. Serial No. 377,101.

*To all whom it may concern:*

Be it known that I, CHRISTIAN STEENSTRUP, a citizen of the United States, residing at Schenectady, in the county of Schenectady, State of New York, have invented certain new and useful Improvements in Elastic-Fluid Turbines, of which the following is a specification.

The present invention relates to elastic fluid turbines and particularly the rotors thereof, and has for its object to provide an improved method of manufacturing bucket or blade rings and attaching them to the bucket carrying member, which latter may be in form of a wheel, a drum or the like, and an improved element for use in carrying out such method.

For a consideration of what I believe to be novel and my invention, attention is directed to the following description and the claims appended thereto.

In the drawing which illustrates certain forms which my invention may take, Fig. 1 is a perspective view of a member of buckets and a strip to which they are attached; Fig. 2 is a radial sectional view of a part of a completed turbine wheel; Fig. 3 is a side elvation of a wheel as shown in Fig. 2; and Figs. 4 to 9 inclusive are views of modifications.

According to the illustrated form of my invention I provide first a strip 10 of suitable material having spaced openings 11 therein and buckets or blades 12 having projections 13 adapted to fit into such openings. Strip 10 may be of the same width or slightly wider than buckets 12 and opening 11 may be formed therein by a punching operation. Such a strip with the openings punched therein can be made of any desired length and the openings can be accurately spaced by a simple punch press operation. The buckets 12 are of straight form having no specially constructed or finished bases and may be made from straight bucket stock by a drawing process, by drop forging, or other suitable way. In any event they are of a form which is simple to make and can be manufactured at a low cost. The openings in strip 10 and the projections 13 are preferably of a shape so as to give buckets 12 the correct angle, and in the present instance such projections are shown as being formed by cutting away the two bottom corners of the buckets. However, they may be formed in any suitable manner and of any suitable contour.

The buckets are first assembled on strip 10 with projections 13 located in openings 11 and such projections are then expanded, as by calking, so as to firmly fasten the buckets to the strip and draw them down tightly against it. If the bottoms of any of the projections 13 project below the surface of strip 10 they are ground off so that the entire surface is smooth and even. The buckets and strip are thus connected together in what may be considered an initial manner.

A strip of suitable length with the buckets thereon is then placed upon a rotor or bucket-carrying member and temporarily fastened thereon as by spot welding or other suitable means; or a strip of the desired length may be bent into a ring and the edges fastened together after which it may be shrunk onto a rotor or bucket-carrying member. The essential thing is that it be firmly fixed on the rotor or bucket-carrying member in an initial temporary manner. The assembled structure is now placed in a suitable muffler and the buckets, strip and bladecarrying member firmly and permanently fastened together by fusion of metal or alloy uniting. Preferably, I employ the method of uniting disclosed in my application, Ser. No. 354,014, filed January 26, 1920 which method as therein set forth comprises bringing the surfaces of the parts to be joined or united into close intimate contact so that the intervening spaces are materially less than a mil in width, and in fact immeasurably small, and then while held in such intimate contact, introducing an alloying metal into the joint or joints to thereby form an alloy film binding said parts together. Various alloying metals may be used in carrying out such method, but preferably I employ copper, and carry out the method by heating the parts to a suitable temperature in the presence of a reducing atmosphere, preferably of hydrogen. However, my invention is not necessarily limited to this specific method of permanently uniting the parts, and it is to be understood that by the term "fusion of metal" I mean the particular method referred to or any suitable known method. After the parts are thus permanently united by fusion of metal they form in substance, one integral structure and may be finished as found desirable. If a cover is to be provided, it may be fastened on the buckets in an initial manner prior to the uniting by fusion of metal and be permanently united to the bucket ends at the same time the buckets, strip and rotor are permanently united. Or, if desired, a bucket cover may be fastened on afterwards, and it may be one continuous strip or made in sections.

In Figs. 2 and 3, a strip 10 with buckets 12 thereon is shown as being placed on a turbine wheel 14 and as being provided with a one-piece bucket cover 15. It will be understood that the strip is initially fastened on wheel 14 in any of the ways just described and then is permanently fastened by fusion of metal, the bucket cover 15 being permanently fastened on the ends of the buckets at the same time.

In Figs. 4, 5 and 6, I have shown a modification in which a strip 10 with buckets 12 initially fastened thereon is wound in a groove 16 in the periphery of a plate 17 which is to form a turbine wheel. After being wound therein the outer edges 18 of the groove are turned down into engagement with the edges of strip 10, as shown in Fig. 5, the strip 10 being slightly wider than the buckets. This serves as an initial means for holding the strip on the bucket-carrying member and the parts are then permanently united by fusion of metal as described above. Preferably they are united by an alloying metal and 19 indicates a piece of metal, copper for example, for this purpose. In these figures, a bucket cover 20 is shown, the same comprising a thin strip wound a number of times around the ends of the buckets. This may be wound in place just after the strip 10 has been initially fastened to plate 17 and it may be initially fastened by spot welding, or arc welding or other suitable means. The layers of the bucket cover will be then permanently united to each other and to the ends of the buckets by fusion of metal at the same time strip 10, the buckets, and plate 17 are permanently united. After having been thus permanently united, the plate 17, strip 10 and bucket cover 20 may be turned down and finished to bring them to the desired shape and dimensions as shown in Fig. 6. To facilitate winding bucket cover strip 20 in place, I may provide the centers of the bucket ends with grooves 20ª into which a projection along the center of strip 20 is seated.

Instead of fastening strip 10 to a bucket-carrying member in the form of a wheel, I may fasten it to a bucket carrying member in the form of a reinforcing strip or ring 21, (see Fig. 7) to which it and the buckets are permanently united by fusion of metal as already described. The reinforcing strip or ring 21 may be then finished to any desired contour for fastening on a rotor. In Fig. 8 it is shown as being provided with undercut grooves forming an annular tongue 22 which fits in a groove 23 in the rim of a turbine wheel 24. In assembling this arrangement, the side walls 25 of groove 23 may be originally sufficiently wide apart to receive tongue 22 between them, after which they may be rolled into engagement with tongue 22, as shown in Fig. 8.

In Fig. 9, the strip or ring 21 is finished to form a base 26 having outwardly sloping sides and this base is then mounted in a groove 27 in a drum 28 and fastened in place by a calking strip 29, as clearly illustrated in Fig. 9. This latter arrangement is particularly useful in connection with turbines of the drum type which in general are reaction machines. As many rings of blades may be put on a drum as is found desirable, three being shown in Fig. 9. The left hand ring shows a calking strip before it has been driven down and expanded and the two right hand rings show calking strips after they have been expanded to hold the bucket ring in place.

In accordance with the provisions of the patent statutes, I have described the principle of operation of my invention, together with the particular method and apparatus which I now consider to represent the best embodiment of my invention, but I desire to have it understood that the particular method and apparatus disclosed is only illustrative and that the invention may be carried out with such modifications as come within the scope of the appended claims.

What I claim as new and desire to secure by Letters Patent of the United States, is:—

1. The method of manufacturing a turbine rotor which comprises taking a continuous strip of material, initially fastening buckets thereon in a temporary manner, winding a length of said strip with the buckets thereon around a carrying-member, and permanently uniting said buckets, strip and member by fusion of metal.

2. The method of manufacturing a turbine rotor which comprises taking a continuous strip of material, having spaced openings therein, fastening bucket ends in said openings to temporarily fasten the buckets to the strip, placing a length of said strip with the buckets therein around a carrying-member, and permanently uniting said buckets, strip, and member by fusion of metal.

3. The method of manufacturing a turbine rotor which comprises taking a continuous strip of material having spaced openings therein, fastening bucket ends in said openings to temporarily fasten the buckets to the strip, bending a length of such strips with the buckets thereon around a rotor and temporarily fastening it thereon, and then permanently uniting said buckets, strip and rotor by fusion of metal.

4. The method of manufacturing a turbine rotor which comprises taking a continuous strip of material, initially fastening buckets thereon in a temporary manner, temporarily fastening a length of said strip with the buckets thereon to a carrying-member, permanently uniting said buckets, strip and member by fusion of metal, and then mounting the integral structure thus formed on a rotor.

5. The method of manufacturing a turbine rotor which comprises taking a continuous strip of material having spaced openings therein, fastening bucket ends in said openings to temporarily fasten buckets to the strip, fastening a length of said strip with the buckets thereon to a carrying-member in a temporary manner, permanently uniting said buckets, strip and member by fusion of metal, and then mounting the member on a rotor.

6. The method of manufacturing a turbine rotor which comprises taking a continuous strip of material, initially fastening buckets thereon in a temporary manner, winding a length of said strip with the buckets thereon around a carrying-member, placing a bucket cover around the outer ends of said buckets, and permanently uniting said bucket cover, buckets, strip and member by fusion of metal.

7. The method of manufacturing a turbine rotor which comprises taking a continuous strip of material, initially fastening buckets thereon in a temporary manner, winding a length of said strip with the buckets thereon around a carrying-member, winding a continuous strip of material around the outer ends of said buckets to form a bucket cover, and permanently uniting said bucket cover, buckets, strip, and member by fusion of metal.

8. An element for use in manufacturing turbine rotors comprising a continuous strip of material having buckets fastened thereon temporarily in correct spaced relation to each other, said strip being adapted to be wound around a carrying-member.

9. An element for use in manufacturing turbine rotors comprising a continuous strip of material having spaced openings therein and buckets having their ends fastened in said openings in an initial temporary manner, said strips being adapted to be wound around a carrying-member.

10. An element adapted to be mounted on a turbine rotor comprising a carrying-member, a continuous strip of material, and buckets all permanently united together by fusion of metal.

11. The method of manufacturing a turbine rotor element which comprises taking a supporting member having a groove therein, a member having openings therein at spaced intervals, and buckets, assembling the parts with the second named member in the groove and the buckets with their ends in said openings, and permanently uniting the whole by fusion of metal.

12. The method of manufacturing a turbine rotor which comprises taking a carrying member having an annular groove therein, a member having openings therein at spaced intervals, and buckets, assembling the parts with the second named member in the groove and the buckets with their ends in said openings, permanently uniting the whole by fusion of metal, and then mounting the integral structure thus formed on a rotor.

13. The method of manufacturing a turbine element which comprises taking a supporting member having a groove therein, mounting fluid directing elements in said groove in spaced relation to each other, turning over an edge of the groove to initially fasten the fluid directing elements in the groove in a temporary manner, and then permanently fastening them by fusion of metal.

14. The method of manufacturing a turbine element which comprises taking a supporting member having a groove therein, mounting blades on the supporting member with ends of said groove, and spacing means between the ends, turning over the edges of the groove to fasten the blades and spacing means in the groove in a temporary manner, and then permanently fastening them by fusion of metal.

15. The method of manufacturing a turbine element which comprises taking a supporting member having a groove therein, mounting blades on the supporting member with ends in said groove and spacing means between the ends, said spacing means being wider than the buckets, turning over the edges of the groove onto said spacing means, and then uniting the parts by fusion of metal.

In witness whereof, I have hereunto set my hand this 26th day of April, 1920.

CHRISTIAN STEENSTRUP.